(12) United States Patent
Lavoie et al.

(10) Patent No.: US 10,611,407 B2
(45) Date of Patent: Apr. 7, 2020

(54) SPEED CONTROL FOR MOTOR VEHICLES

(71) Applicant: Ford Global Technologies, LLC, Dearborn, MI (US)

(72) Inventors: Erick Michael Lavoie, Dearborn, MI (US); Donald Jacob Mattern, Canton, MI (US); Joseph M. Raad, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 624 days.

(21) Appl. No.: 15/284,791

(22) Filed: Oct. 4, 2016

(65) Prior Publication Data
US 2017/0106865 A1    Apr. 20, 2017

Related U.S. Application Data

(60) Provisional application No. 62/243,475, filed on Oct. 19, 2015.

(51) Int. Cl.
*B60L 3/08* (2006.01)
*B60W 50/02* (2012.01)
(Continued)

(52) U.S. Cl.
CPC .......... *B62D 15/027* (2013.01); *B62D 13/06* (2013.01)

(58) Field of Classification Search
CPC ......... B62D 15/027; B62D 13/06; B60L 3/08; B60W 50/02; B60W 50/085
See application file for complete search history.

(56) References Cited

U.S. PATENT DOCUMENTS 3,542,390 A    11/1970  Fikes et al.
3,605,088 A    9/1971   Savelli
(Continued)

FOREIGN PATENT DOCUMENTS

CN    102582686 B    9/2013
DE    3923676 A1     1/1991
(Continued)

OTHER PUBLICATIONS

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.
(Continued)

*Primary Examiner* — Christian Chace
*Assistant Examiner* — Aaron C Smith
(74) *Attorney, Agent, or Firm* — Raymond Coppiellie; Price Heneveld LLP

(57) ABSTRACT

A trailer backup assist system is provided herein. The trailer backup assist system includes a hitch angle sensor configured to determine a hitch angle between a vehicle and a trailer attached thereto. An input device is configured to accept an input command corresponding to a trailer path command curvature. A controller is configured to determine a vehicle threshold speed limit by determining a first vehicle speed limit based on the hitch angle and a second speed limit based on the command curvature. The controller generates a command to limit vehicle speed in a reverse direction below the threshold speed limit.

9 Claims, 10 Drawing Sheets

(51) Int. Cl.
    *B62D 15/02*    (2006.01)
    *B62D 13/06*    (2006.01)

(56) References Cited

U.S. PATENT DOCUMENTS

| | | |
|---|---|---|
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,735,432 A | 4/1988 | Brown |
| 4,752,080 A | 6/1988 | Rogers |
| 4,848,449 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,056,371 A | 5/2000 | Lin et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,567,731 B2 | 5/2003 | Chandy |
| 6,568,093 B2 | 5/2003 | Kogiso et al. |
| 6,577,952 B2 | 6/2003 | Geier et al. |
| 6,668,225 B2 | 12/2003 | Oh et al. |
| 6,704,653 B2 | 3/2004 | Kuriya et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese, V et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,342,560 B2 | 1/2013 | Albers et al. |
| 8,380,390 B2 | 2/2013 | Sy et al. |
| 8,380,416 B2 | 2/2013 | Offerle et al. |
| 8,393,632 B2 | 3/2013 | Vortmeyer et al. |

(56) References Cited

U.S. PATENT DOCUMENTS

| | | |
|---|---|---|
| 8,401,744 B2 | 3/2013 | Chiocco |
| 8,427,288 B2 | 4/2013 | Schofield et al. |
| 8,469,125 B2 | 6/2013 | Yu et al. |
| 8,504,243 B2 | 8/2013 | Kageyama |
| 8,548,680 B2 | 10/2013 | Ryerson et al. |
| 8,548,683 B2 | 10/2013 | Cebon et al. |
| 8,576,115 B2 | 11/2013 | Basten |
| 8,626,382 B2 | 1/2014 | Obradovich |
| 8,675,953 B1 | 3/2014 | Elwell et al. |
| 8,755,984 B2 | 6/2014 | Rupp et al. |
| 8,807,261 B2 | 8/2014 | Subrt et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |
| 9,248,858 B2 | 2/2016 | Lavoie et al. |
| 9,296,422 B2 | 3/2016 | Lavoie |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,393,996 B2 | 7/2016 | Goswami et al. |
| 9,428,188 B2 | 8/2016 | Schwindt et al. |
| 9,434,414 B2 | 9/2016 | Lavoie |
| 9,500,497 B2 | 11/2016 | Lavoie |
| 9,610,974 B2 | 4/2017 | Herzog et al. |
| 9,616,923 B2 | 4/2017 | Lavoie |
| 9,623,904 B2 | 4/2017 | Lavoie et al. |
| 9,676,377 B2 | 6/2017 | Hafner et al. |
| 9,798,953 B2 | 10/2017 | Hu |
| 9,827,818 B2 | 11/2017 | Hu et al. |
| 9,836,060 B2 | 12/2017 | Ghneim et al. |
| 9,840,278 B2 | 12/2017 | Lavoie et al. |
| 10,046,800 B2 | 8/2018 | Hu et al. |
| 2001/0024333 A1 | 9/2001 | Rost |
| 2001/0037164 A1 | 11/2001 | Hecker |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1* | 8/2014 | Lavoie ............... G08G 1/0962 348/148 |
| 2014/0222288 A1 | 8/2014 | Lavoie et al. |
| 2014/0236532 A1 | 8/2014 | Trombley et al. |
| 2014/0249691 A1 | 9/2014 | Hafner et al. |

(56) References Cited

U.S. PATENT DOCUMENTS

| | | |
|---|---|---|
| 2014/0267688 A1 | 9/2014 | Aich et al. |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |
| 2015/0298738 A1 * | 10/2015 | Hoel ................ B62D 13/06 701/41 |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0229452 A1 | 8/2016 | Lavoie et al. |
| 2016/0280267 A1 | 9/2016 | Lavoie et al. |
| 2017/0073005 A1 | 3/2017 | Ghneim et al. |
| 2017/0101130 A1 | 4/2017 | Lavoie |
| 2017/0106796 A1 | 4/2017 | Lavoie et al. |
| 2017/0174130 A1 | 6/2017 | Hu et al. |
| 2017/0297619 A1 | 10/2017 | Lavoie et al. |
| 2017/0297620 A1 | 10/2017 | Lavoie et al. |
| 2017/0313351 A1 | 11/2017 | Lavoie |

FOREIGN PATENT DOCUMENTS

| | | |
|---|---|---|
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 0433858 A2 | 6/1991 |
| EP | 1361543 A2 | 11/2003 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2013186208 A2 | 12/2013 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |

(56) References Cited

FOREIGN PATENT DOCUMENTS

WO 2015074027 A1 5/2015
WO 2015187467 A1 12/2015

OTHER PUBLICATIONS

"Ford Super Duty: Truck Technologies", Brochure, Sep. 2011, 2 pages.
Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhöfer; D. Cebon, "An Investigation of ABS Strategies for Articulated Vehicles", Cambridge University, Engineering Department, United Kingdom, date unknown, 13 pages.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.

Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane McGrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, vol. 225, No. 7, Jul. 2011, 1 page.
Haviland, G S, "Automatic Brake Control For Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=1860575499&lang=engb&print=1, date unknown, 5 pages.
"VBOX Yaw Rate Sensor With Integral Accelerometers," Racelogic, www.racelogic.co.uk, date unknown, 2 pages.
P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.

(56) References Cited

OTHER PUBLICATIONS

Olof Enqvist, "AFS-Assisted Trailer Reversing," Institutionen för systemteknik Deartment of Electrical Engineering, Jan. 27, 2006, 57 pages.

* cited by examiner

SPEED CONTROL FOR MOTOR VEHICLES

CROSS-REFERENCE TO RELATED APPLICATION

This application claims benefit from U.S. Provisional Patent Application No. 62/243,475, which was filed on Oct. 19, 2015, entitled "SPEED OPTIMIZED TRAJECTORY CONTROL FOR MOTOR VEHICLES," the entire disclosure of which is hereby incorporated herein by reference.

FIELD OF THE INVENTION

The present invention generally relates to systems for controlling/assisting vehicles during backup operations, and in particular to a system that controls vehicle speed during parking and/or trailer backup operations.

BACKGROUND OF THE INVENTION

Backing up a vehicle with a trailer can be a difficult task. In conventional motor vehicles, the operator must control the steering and vehicle speed while the vehicle is moving in reverse. Trailer backup assist systems have been developed to assist operators when backing up a vehicle having a trailer attached thereto.

Motor vehicles may also include active park assist systems that assist a driver during vehicle parking operations. Such systems may be configured to provide automated parking. During parking operations, the vehicle may be moved in a reverse direction.

The path that a vehicle is capable of following in reverse is limited by the design of the vehicle and trailer (if present), and road conditions. Furthermore, the path that a vehicle (and trailer) is capable of in a reverse direction may be more limited at higher vehicle speeds.

SUMMARY OF THE INVENTION

According to one aspect of the present invention, a trailer backup assist system is disclosed. The trailer backup assist system includes a hitch angle sensor configured to determine a hitch angle between a vehicle and a trailer attached thereto. An input device is configured to accept an input command corresponding to a trailer path command curvature. A controller is configured to determine a vehicle threshold speed limit by determining a first vehicle speed limit based on the hitch angle and a second speed limit based on the command curvature. The controller generates a command to limit vehicle speed in a reverse direction below the threshold speed limit.

According to another aspect of the present invention, a trailer backup assist system is disclosed. The trailer backup assist system includes a hitch angle sensor sensing a hitch angle between a vehicle and a trailer attached thereto. An input device is configured to accept a trailer path command curvature. A controller is configured to determine a maximum allowable vehicle threshold speed limit in a reverse direction as a function of the hitch angle and the desired trailer curvature.

According to yet another aspect of the present invention, a method of controlling a speed of a motor vehicle is disclosed. The method includes determining a hitch angle between a vehicle and a trailer attached to the vehicle. Next, a trailer curvature command is determined based on an input device input magnitude. A first vehicle speed limit based on the hitch angle is calculated. A second speed limit based on the trailer path curvature command is calculated. A threshold speed limit based on the first and second speed limits is then determined.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
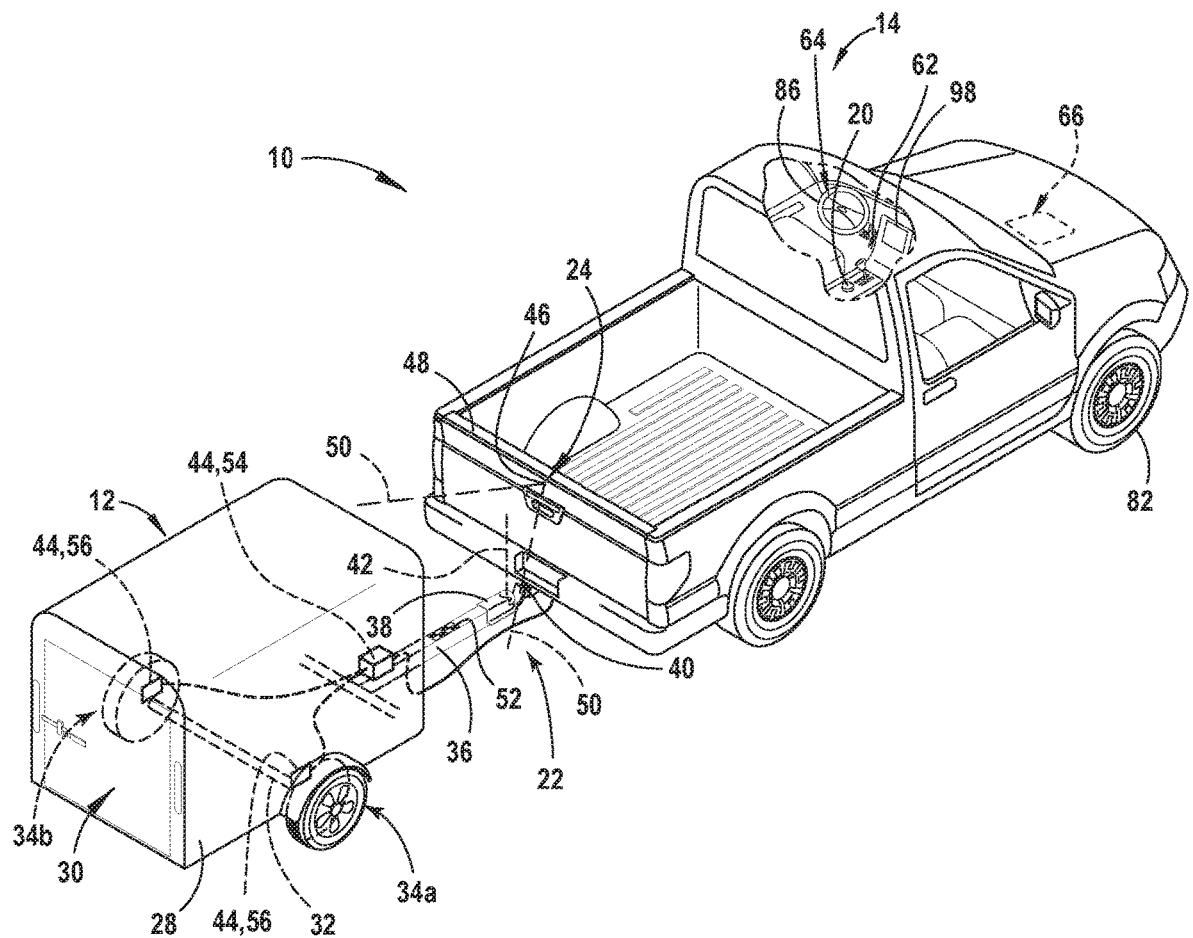
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-11, reference numeral 10 generally designates a trailer backup assist system for controlling a backing path of a trailer 12 attached to a vehicle 14 by allowing a driver of the vehicle 14 to specify a desired command curvature $\kappa_2$ or backing path 16 of the trailer 12. In one embodiment, the trailer backup assist system 10 automatically steers the vehicle 14 to guide the trailer 12 on the desired curvature $\kappa_2$ as a driver uses the accelerator and/or brake pedals to control the reversing speed of the vehicle 14. In addition, the trailer backup assist system 10 may include an input device 18, such as a rotatable knob 20, for a driver to provide a desired rotational angle that is correlated to a corresponding desired command curvature $\kappa_2$ of the trailer 12. To monitor the position of the trailer 12 relative to the vehicle 14, the trailer backup assist system 10 may include a sensor system 22 that senses a hitch angle γ between the trailer 12 and the vehicle 14, which may be generally referred to as a hitch angle sensor 24. To avoid unacceptable trailer backup conditions, such as a jackknife condition, the hitch angle γ and desired command curvature $\kappa_2$ may be monitored and processed. A first vehicle speed limit may be generated based on the hitch angle γ and a second vehicle speed limit may be generated based on the desired command curvature $\kappa_2$ for assisting in the prevention of unacceptable backup conditions. A controller 26 may filter the first and second speed limits and calculate a threshold speed limit based on the two inputted speed limits. The vehicle threshold speed limit may be the speed limit at which the vehicle 14 operates for assisting in the mitigation of unacceptable backup conditions. For example, according to one embodiment, the controller 26 may set the vehicle threshold speed limit at the minimum of the first and second speed limits during some phases of the backup process.

With reference to the embodiment shown in FIG. 1, the vehicle 14 is a pickup truck that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 28 with an enclosed cargo area 30, a single axle 32 having a right wheel assembly 34a and a left wheel assembly 34b, and a tongue 36 longitudinally extending forward from the enclosed cargo area 30. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer 12 may include more than one axle 32 and may have various shapes and sizes configured for different loads and items, such as a boat trailer or a flatbed trailer.

Still referring to FIG. 1, the sensor system 22, in the illustrated embodiment, includes both a sensor module 44 and a vision-based hitch angle sensor 24 for estimating the hitch angle γ between the vehicle 14 and the trailer 12. The illustrated hitch angle sensor 24 employs a camera 46 (e.g., video imaging camera) that may be located proximate an upper region of the vehicle tailgate 48 at the rear portion of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab of the vehicle 14 to capture images of a gooseneck trailer. Furthermore, it is contemplated that additional embodiments of the hitch angle sensor 24 and the sensor system 22 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 24.

The embodiment of the sensor module 44 illustrated in FIG. 1 includes a housed sensor cluster 54 mounted on the tongue 36 of the trailer 12 proximate the enclosed cargo area 30 and includes left and right wheel speed sensors 56 on laterally opposing wheels of the trailer 12. It is conceivable that the wheel speed sensors 56 may be bi-directional wheel speed sensors 56 for monitoring both forward and reverse speeds. Also, it is contemplated that the sensor cluster 54, in additional embodiments, may be mounted on alternative portions of the trailer 12 and/or the vehicle 14.

The sensor module 44 generates a plurality of signals indicative of various dynamics of the trailer 12. The signals may include a yaw rate signal, a lateral acceleration signal, and wheel speed signals generated respectively by a yaw rate sensor 58 (FIG. 3), an accelerometer 60 (FIG. 3), and the wheel speed sensors 56. Accordingly, in the illustrated embodiment, the yaw rate sensor 58 and the accelerometer 60 are contained within the housed sensor cluster 54, although other configurations are conceivable. It is conceivable that the accelerometer 60, in some embodiments, may be two or more separate sensors and may be arranged at an offset angle, such as two sensors arranged at plus and minus forty-five degrees from the longitudinal direction of the trailer 12 or arranged parallel with the longitudinal and lateral directions of the trailer 12, to generate a more robust acceleration signal. It is also contemplated that these sensor signals could be compensated and filtered to remove offsets or drifts, and smooth out noise. Further, the controller 26 (FIG. 3) may utilize processed signals received outside of the sensor system 22, including standard signals from the brake control system 62 (FIG. 3) and the power assist steering system 64 (FIG. 3), such as vehicle yaw rate $\omega_1$, vehicle speed $v_1$, and steering angle $\delta$, to estimate the trailer hitch angle $\gamma$, trailer speed, and related trailer parameters. As described in more detail below, the controller 26 may estimate the hitch angle $\gamma$ based on the trailer yaw rate $\omega_2$, the vehicle yaw rate $\omega_1$, and the vehicle speed $v_1$ in view of a kinematic relationship between the trailer 12 and the vehicle 14. The controller 26 of the trailer backup assist system 10 may also utilize the estimated trailer variables and trailer parameters to control the steering system 64, brake control system 62, and the powertrain control system 66 (FIG. 3), such as to assist backing the vehicle 14 and trailer 12 combination or to mitigate an unacceptable backup condition.

Figure 2:
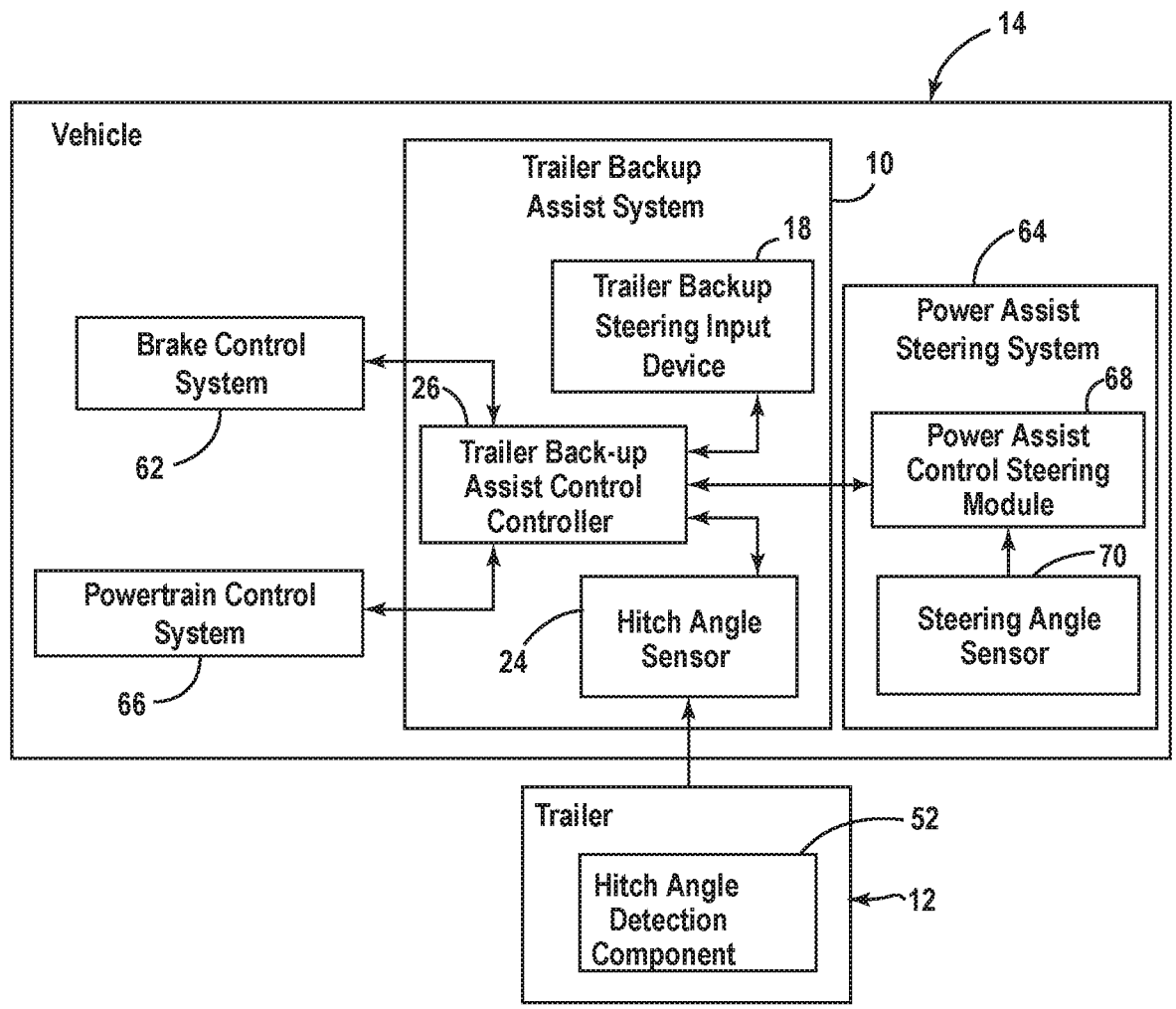
FIG. 2 is a schematic view of a motor vehicle including a trailer backup assist system according to one embodiment.

With reference to FIG. 2, the trailer backup assist system 10, according to one embodiment, includes the trailer backup input device 18 that is operably connected to a trailer backup assist controller 26. The trailer backup assist system 10 further includes the hitch angle sensor 24 that is operably connected to the trailer backup assist controller 26.

The trailer backup assist controller 26 is operably connected to a brake control system 62 and a power control system 66. The vehicle 14 also includes a power steering assist system 64 including a power assist steering control module 68 and a steering angle sensor 70. The power assist steering control module 68 is operably connected to the trailer backup assist controller 26. The trailer 12 may include a hitch angle sensor 24 that is operably connected to the hitch angle sensor 24 of vehicle 14.

The hitch angle sensor 24 is configured to measure the angle of the trailer 12 relative to the vehicle 14 about a vertical axis. A hitch angle $\gamma$ of zero generally corresponds to an operating condition wherein the trailer 12 is aligned with vehicle 14 such that the vehicle 14 and the trailer 12 move along a straight path. The hitch angle sensor 24 may also be configured to measure an orientation of the trailer 12 relative to the vehicle 14 about a first horizontal axis that extends side-to-side, and a second horizontal axis that extends in a vehicle 14 fore-aft direction. This enables the trailer backup assist system 10 to determine if the trailer 12 has begun to move up a slope and/or if the trailer 12 has twisted relative to vehicle 14 due to moving onto a surface that is sloped to the side. It will be understood that various hitch angle detection/measuring devices may be utilized, and the components may be mounted on vehicle 14, on trailer 12, or on both.

Figure 3:
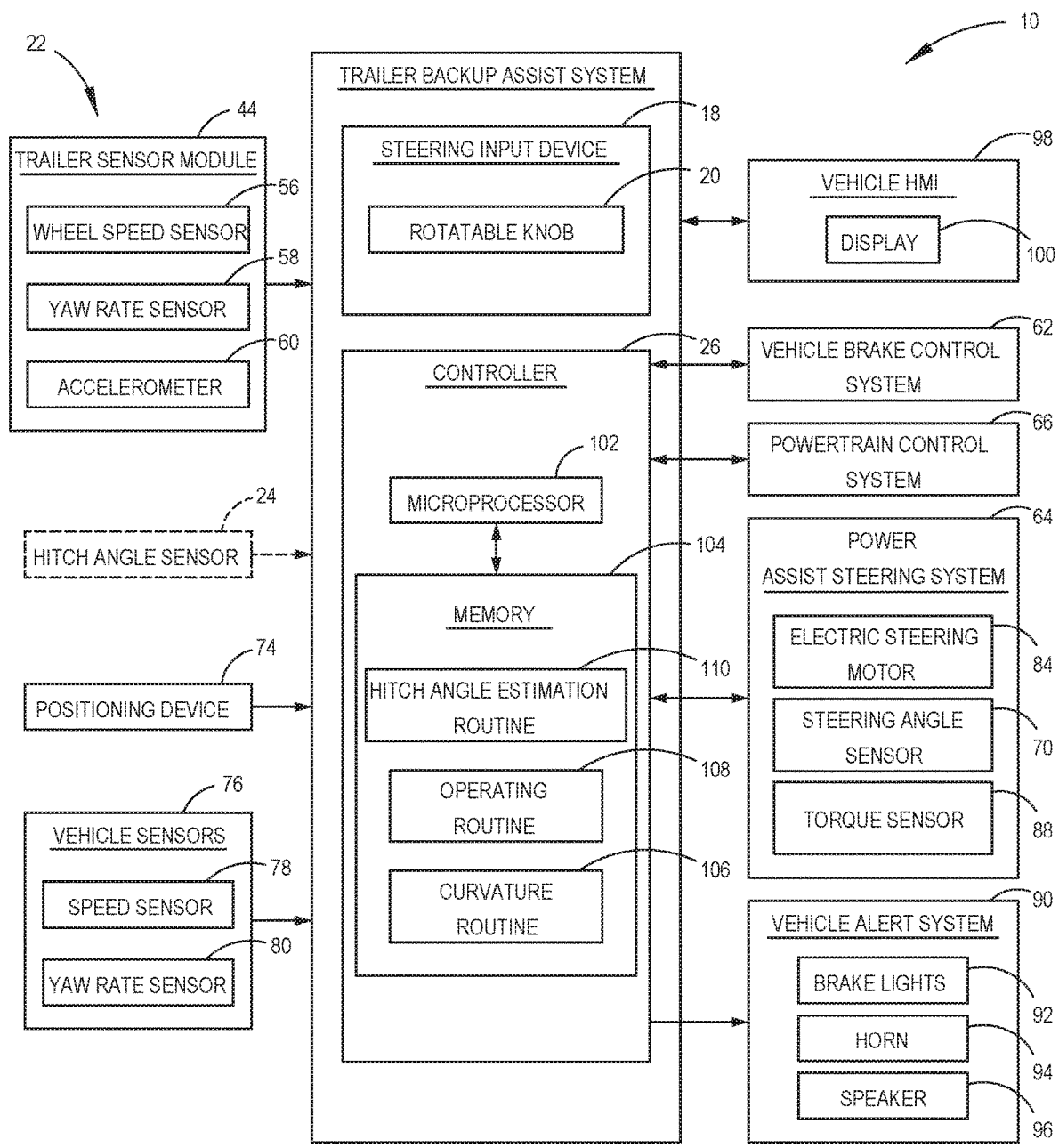
FIG. 3 is a block diagram illustrating one embodiment of the trailer backup assist system having a input device, a curvature controller, and a vehicle braking system.

With reference to the embodiment of the trailer backup assist system 10 shown in FIG. 3, the hitch angle sensor 24 provides the sensed hitch angle $\gamma$ to the trailer backup assist system 10. Similarly, the illustrated embodiment of the trailer backup assist system 10 receives vehicle status-related information from additional sensors and devices. This information includes positioning information from a positioning device 74, which may include a global positioning system (GPS) on the vehicle 14 or a handled device, to determine a coordinate location of the vehicle 14 and the trailer 12 based on the location of the positioning device 74 with respect to the trailer 12 and/or the vehicle 14 and based on the sensed hitch angle $\gamma$. The positioning device 74 may additionally or alternatively include a dead reckoning system for determining the coordinate location of the vehicle 14 and the trailer 12 within a localized coordinate system based at least on vehicle speed, steering angle, and hitch angle $\gamma$. Other vehicle information received by the trailer backup assist system 10 may include a speed of the vehicle 14 from speed sensors 78 and a yaw rate of the vehicle 14 from a yaw sensor 80. It is contemplated that in additional embodiments the hitch angle sensor 24 and other vehicle sensors 76 and devices may provide sensor signals or other information, such as proximity sensor signals or successive images of the trailer 12, that a controller 26 of the trailer backup assist system 10 may process with various routines to determine a value or an indicator, such as a hitch angle $\gamma$ value or a range of hitch angles.

As further shown in FIG. 3, one embodiment of the trailer backup assist system 10 is in communication with a power assist steering system 64 of the vehicle 14 to operate steered wheels 82 (FIG. 1) of the vehicle 14 for moving the vehicle 14 in such a manner that the trailer 12 reacts in accordance with the desired command curvature $\kappa_2$ of the trailer 12. In the illustrated embodiment, the power assist steering system 64 is an electric power-assisted steering (EPAS) system that includes an electric steering motor 84 for turning the steered wheels 82 to a steering angle based on a steering command, whereby the steering angle is sensed by a steering angle sensor 70 of the power assist steering system 64. The steering command may be provided by the trailer backup assist system 10 for autonomously steering during a backup maneuver and may alternatively be provided manually via a rotational position (e.g., steering wheel angle) of a steering wheel 86 (FIG. 1). However, in the illustrated embodiment, the steering wheel 86 of the vehicle 14 is mechanically coupled with the steered wheels 82 of the vehicle 14, such that the steering wheel 86 moves in concert with steered wheels 82, preventing manual intervention with the steering wheel 86 during autonomous steering. More specifically, a torque sensor 88 is provided on the power assist steering system 64 that senses torque on the steering wheel 86 that is not expected from autonomous control of the steering wheel 86 and therefore indicative of manual intervention, whereby the trailer backup assist system 10 may alert the driver to discontinue manual intervention with the steering wheel 86 and/or discontinue autonomous steering.

In alternative embodiments, some vehicles 14 have a power assist steering system 64 that allows a steering wheel 86 to be partially decoupled from movement of the steered wheels 82 of such a vehicle 14. Accordingly, the steering wheel 86 can be rotated independent of the manner in which the power assist steering system 64 of the vehicle controls the steered wheels 82 (e.g., autonomous steering as commanded by the trailer backup assist system 10). As such, in these types of vehicles 14 where the steering wheel 86 can be selectively decoupled from the steered wheels 82 to allow independent operation thereof, the steering wheel 86 may be used as a input device 18 for the trailer backup assist system 10, as disclosed in greater detail herein.

Referring again to the embodiment illustrated in FIG. 3, the power assist steering system 64 provides the controller 26 of the trailer backup assist system 10 with information relating to a rotational position of steered wheels 82 of the vehicle 14, including a steering angle. The controllers 26 in the illustrated embodiment process the current steering angle, in addition to other vehicle 14 and trailer 12 conditions to guide the trailer 12 along the desired command curvature $\kappa_2$. It is conceivable that the trailer backup assist system 10, in additional embodiments, may be an integrated component of the power assist steering system 64. For example, the power assist steering system 64 may include a trailer backup assist algorithm for generating vehicle steering information and commands as a function of all or a portion of information received from the input device 18, the hitch angle sensor 24, the power assist steering system 64, a vehicle brake control system 62, a powertrain control system 66, and other vehicle sensors 76 and devices.

As also illustrated in FIG. 3, the vehicle brake control system 62 may also communicate with the controller 26 to provide the trailer backup assist system 10 with braking information, such as wheel speed, and to receive braking commands from the controller 26. For instance, vehicle speed information can be determined from individual wheel speeds as monitored by the brake control system 62. Vehicle speed may also be determined from the powertrain control system 66, the speed sensors 78, and the positioning device 74, among other conceivable means. In some embodiments, individual wheel speeds can also be used to determine a vehicle yaw rate, which can be provided to the trailer backup assist system 10 in the alternative or in addition to the yaw sensor 80, for use in determining the vehicle steering commands. In certain embodiments, the trailer backup assist system 10 can provide vehicle braking information to the brake control system 62 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate (i.e., the change in hitch angle over time), hitch angle $\gamma$ dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. The trailer backup assist system 10 can also issue a warning signal corresponding to a notification of an actual, impending, and/or anticipated unacceptable trailer backup condition, as disclosed in greater detail herein.

The powertrain control system 66, as shown in the embodiment illustrated in FIG. 3, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and hitch angle $\gamma$ dynamic instability. Similar to high-speed considerations as they relate to unacceptable trailer backup conditions, high acceleration, and high dynamic driver desired command curvatures $\kappa_2$ can also lead to such unacceptable trailer backup conditions.

With continued reference to FIG. 3, the trailer backup assist system 10 in the illustrated embodiment may communicate with one or more devices including vehicle warning devices 90 that may be used to alert the driver of the vehicle in a variety of forms. For instance, the vehicle warning devices 90 may utilize the generated warning signal to prompt visual, auditory, and tactile warnings. As such, the vehicle warning devices 90 may include lights 92, such as exterior brake lights and vehicle emergency flashers, as well as interior dash lights and mirror lights. Also, with respect to auditory warnings, the vehicle warning devices 90 may include a vehicle horn 94 and/or a speaker 96 within the vehicle 14. Additionally, the trailer backup assist system 10 may communicate warnings and other information with a human machine interface (HMI) 98 for the vehicle 14 including a vehicle display 100, such as a center stack mounted navigation/entertainment display (FIG. 1). With respect to a tactile or haptic warning, the vehicle warning devices 90 may include a variety of equipment, such as the input device 18, a driver's seat, and/or other vehicle devices. Further, the trailer backup assist system 10 may communicate via wireless communication with another embodiment of the HMI 98, such as with one or more handheld or portable devices, including one or more smartphones. The portable device may also include the display 100 for displaying one or more images and other information to a user. For instance, the portable device may display one or more images of the trailer 12 and the target location within a desired target placement zone on display. In addition, the portable device may provide feedback information, such as audible and tactile warnings.

As further illustrated in FIG. 3, the trailer backup assist system 10 includes an input device 18 that is connected to the controller 26 for allowing communication of information therebetween. It is disclosed herein that the input device 18 can be coupled to the controller 26 in a wired or wireless manner. The input device 18 provides the trailer backup assist system 10 with information defining the desired backing path 16 of travel of the trailer 12 for the controller 26 to process and generate steering commands. Namely, the input device 18 accepts an inputted input command based on a desired trailer curvature that is inputted through the input device 18 and, in response, provides a desired curvature $\kappa_2$ of travel of the trailer 12. Also, the trailer steering commands can include information relating to a commanded change in the path of travel, such as a change in radius of the backing path 16 (e.g., the curvature) and information relating to an indication that the trailer 12 is to travel along a path defined by a longitudinal centerline axis of the trailer 12 (i.e., along a substantially straight path of travel or zero curvature). As will be discussed below in more detail, the input device 18 according to the illustrated embodiment may include the input device 18 for selecting the longitudinal direction of the trailer 12, the longitudinal direction of the vehicle 14, or the curvature based on the present hitch angle $\gamma$.

The input device 18 in the illustrated embodiment may additionally, or alternatively, include a rotational control input device for allowing a driver of the vehicle 14 to command desired trailer steering actions or otherwise select the desired input command and/or the desired curvature $\kappa_2$. For instance, the rotational control input device may be a rotatable knob 20, which can be rotatable about a rotational axis extending through a top surface or face of the knob 20. In other embodiments, the rotatable knob 20 may be rotatable about a rotational axis extending substantially parallel to a top surface or face of the rotatable knob 20. Furthermore, the input device 18, according to additional embodiments, may include alternative devices for providing a desired input command or other information defining a desired backing path 16, such as a joystick, depressible buttons, sliding input devices, various controls on a portable device, various user interfaces on a touch-screen display, vision-based systems for receiving gestures, a trajectory planner or other programmable route system, and other conceivable input devices as generally understood by one having ordinary skill in the art.

Still referring to the embodiment shown in FIG. 3, the controller 26 is configured with a microprocessor 102 to process logic and routines stored in memory 104 that receive information from the input device 18, the hitch angle sensor 24, the power assist steering system 64, the vehicle brake control system 62, the powertrain control system 66, and other vehicle sensors 76 and devices. As recited above, the controller 26 may process the hitch angle and related information from the hitch angle sensor 24 or other input to generate a warning signal with enough time for the driver to respond to an unacceptable trailer backup condition. Examples of unacceptable trailer backup conditions include, but are not limited to, an over speed condition, a high hitch angle rate, hitch angle γ dynamic instability, a calculated theoretical trailer jackknife condition, a physical contact jackknife limitation, the trailer 12 or the vehicle 14 approaching physical contact with an object, and the like. It is disclosed herein that the trailer backup assist system 10 can issue an alert signal corresponding to a notification of an actual, impending, and/or anticipated unacceptable trailer backup condition.

The controller 26 may additionally or alternatively generate vehicle steering information and commands as a function of all or a portion of the information received from the input device 18, the hitch angle sensor 24, the power assist steering system 64, the vehicle brake control system 62, the trailer braking system, the powertrain control system 66, and other vehicle sensors 76 and devices. Thereafter, the vehicle steering information and commands may be provided to the power assist steering system 64 for affecting steering of the vehicle 14 to achieve a commanded path of travel for the trailer 12. The controller 26 may include the microprocessor 102 and/or other analog and/or digital circuitry for processing one or more routines. Also, the controller 26 may include the memory 104 for storing one or more routines, including a curvature routine 106, an operating routine 108, and a hitch angle estimating routine 110. It should be appreciated that the controller 26 may be a stand-alone dedicated controller or may be a shared controller integrated with other control functions, such as integrated with the sensor system 22, the power assist steering system 64, and other conceivable onboard or off-board vehicle control systems.

Figure 4:
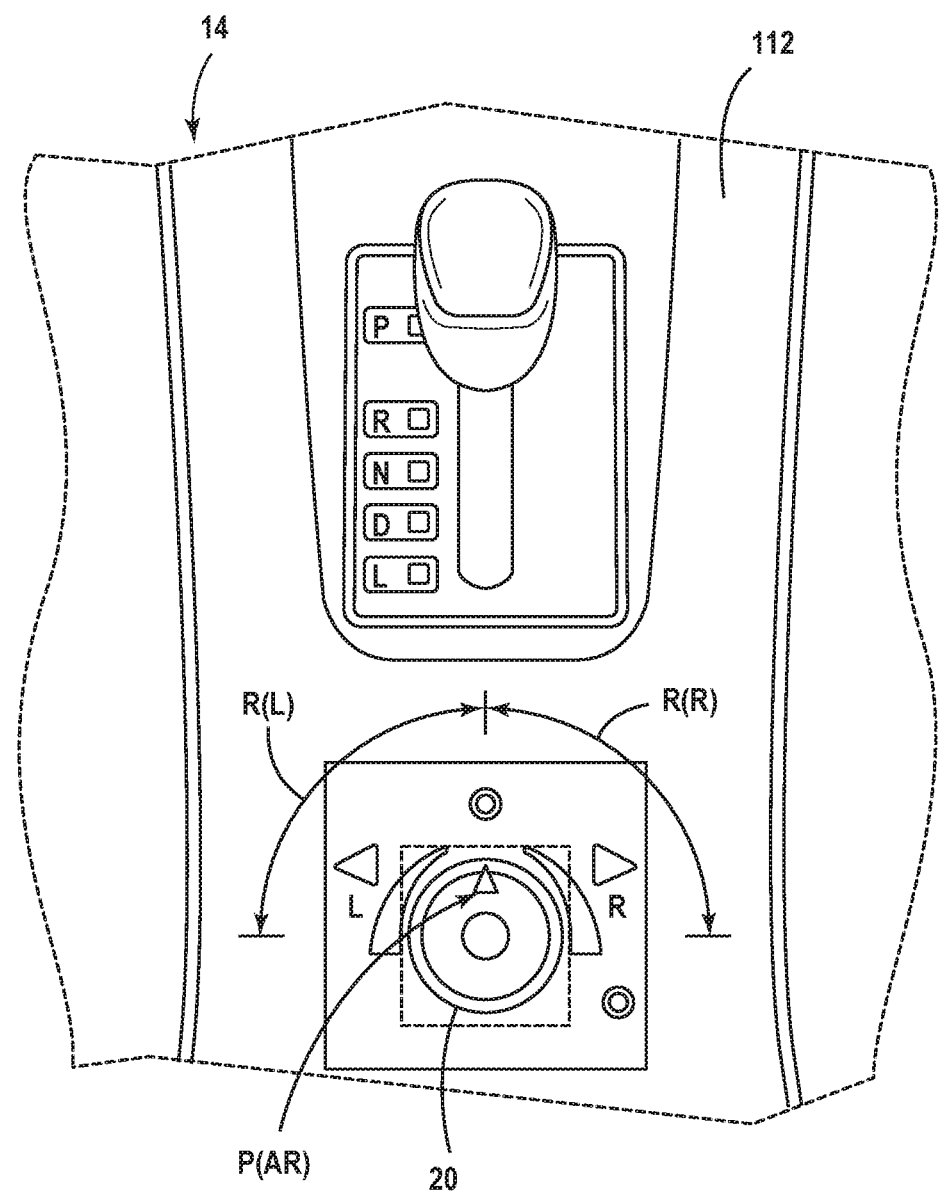
FIG. 4 is a fragmentary view of a portion of a vehicle interior including an auxiliary steering input that can be utilized by a vehicle operator when the vehicle is backing up with a trailer attached thereto.

With reference to FIG. 4, an input device 18, such as a rotatable knob 20, may be mounted to a vehicle interior component such as a center console 112. Upon activation of the trailer backup assist system 10, a user can rotate knob 20 to provide a user steering request, or input command, to the power steering assist system 64. During vehicle backup operations, a user can utilize the knob 20 to provide steering input rather than rotating the vehicle steering wheel. More specifically, the angular position of the rotatable knob 20 may correlate to a desired command curvature $\kappa_2$, such that rotation of the knob 20 to a different angular position provides a different desired curvature $\kappa_2$ with an incremental change based on the magnitude of rotation. As discussed in more detail below, the trailer backup assist system 10 may be configured to generate steering command signals to change the wheel angle of the steered wheels. The steering command signals may be directly proportional to the user steering request, or the system may override or modify the steering request to generate steering command signals. The rotatable knob 20 may be biased (e.g., by a spring return) to a center or at-rest position P(AR) between opposing rotational ranges of motion R(R), R(L).

With further reference to FIG. 4, a first opposing rotational range of motion R(R) is substantially equal to a second opposing rotational range of motion R(L). To provide a tactile indication of an amount of rotation of the rotatable knob 20, a force that biases the knob 20 toward the at-rest position P(AR) can increase (e.g., non-linearly) as a function of the amount of rotation of the rotatable knob 20 with respect to the at-rest position P(AR). Additionally, the rotatable knob 20 can be configured with position indicating detents such that the driver can positively feel the at-rest position P(AR) and feel the ends of the opposing rotational ranges of motion R(L), R(R) approaching (e.g., soft end stops). The input device knob 20 and operation thereof is described in detail in copending U.S. patent application Ser. No. 14/813,642, entitled "MULTI-MODE TRAILER BACKUP ASSIST INTERFACE KNOB," filed Jul. 30, 2015, the entire disclosure of which is incorporated herein by reference.

Figure 5:
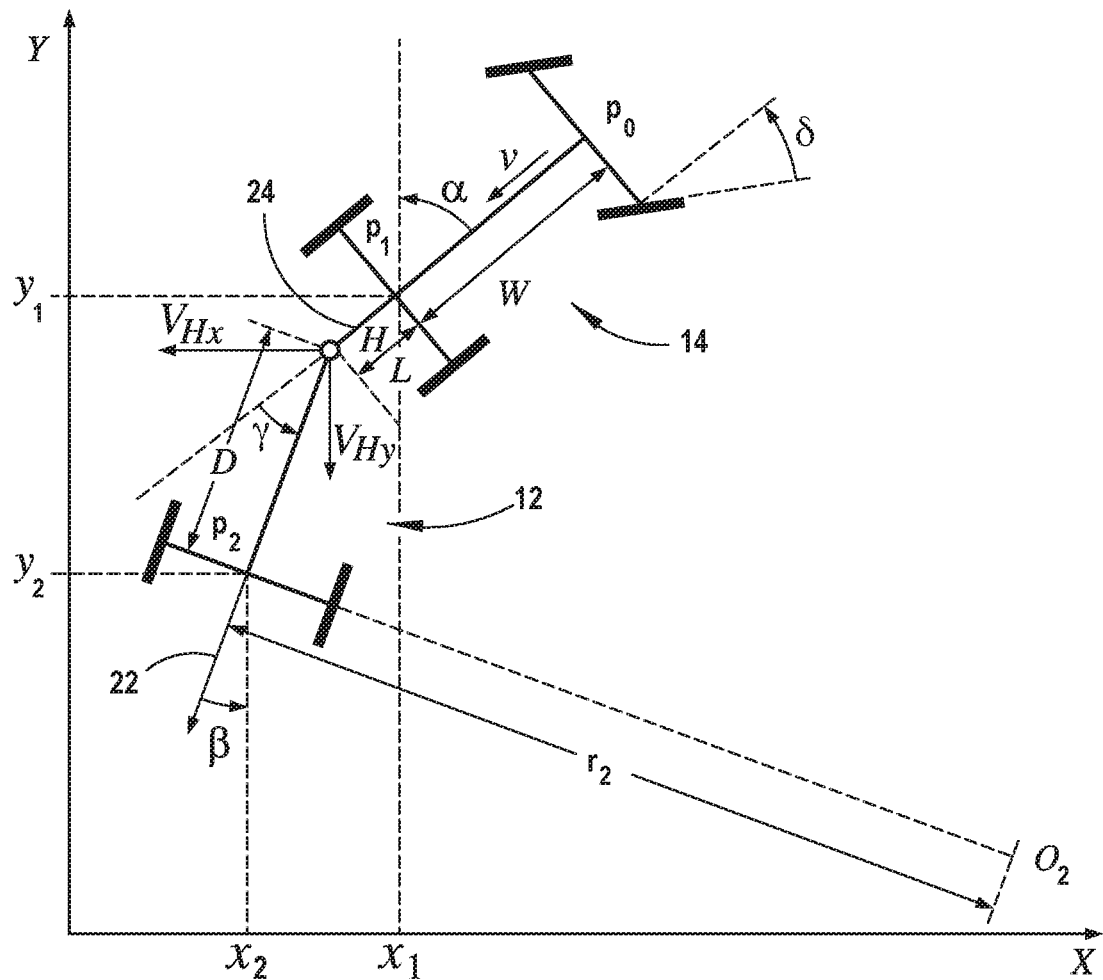
FIG. 5 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 5, a kinematic relationship between a curvature of a path of travel of the trailer 12 and the steering angle of the vehicle 14 towing the trailer 12 can be determined for a trailer backup assist system 10 configured in accordance with some embodiments, including for use by the curvature routine 106 of the controller 26 in one embodiment. To achieve such a kinematic relationship, certain assumptions may be made with regard to parameters associated with the vehicle 14 and trailer 12 system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 5, for a trailer backup assist system 10 defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: length between hitch point and rear axle of the vehicle;
D: distance between hitch point and axle of the trailer or effective axle for a multiple axle trailer (axle length may be an equivalent); and
$r_2$ curvature radius for the trailer.

One embodiment of a kinematic relationship between trailer path radius of curvature $r_2$ at the midpoint of an axle of the trailer 12, steering angle δ of the steered wheels 82 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle 14 and trailer 12 combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ is determined from the driver input via the input device 18. Through the use of the equation for providing steering angle, a corresponding steering command can be generated by the curvature routine 106 for controlling the power assist steering system 64 of the vehicle 14. Additionally, the controller 26 based on the driver's manipulation of the input device 18 may also predict an unacceptable backup condition. Accordingly, the trailer backup assist system 10 may set a desired command curvature $\kappa_2$ speed limit based on the rotation on the manipulation of the input device 18 to assist in preventing unacceptable backup conditions.

Still referring to FIG. 5, the memory of the controller 26 may include look-up tables (LUTs) that include a correlation between desired command curvature $\kappa_2$ and the time to reach the desired command curvature $\kappa_2$. Accordingly, the controller 26 may predict an unacceptable backup condition, such as a jackknife condition, prior to the trailer 12 reaching the specific situation. Thus, the controller 26 may set a maximum desired command curvature speed limit as the user input device 18 input magnitude is varied based on a value within the LUT such that the jackknife condition may be prevented. Reducing the maximum vehicle speed based on the desired command curvature $\kappa_2$ may also reduce noise during usage of the trailer backup assist system 10.

In an additional embodiment, an assumption may be made by the curvature routine 106 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer is substantially vertically aligned with the rear axle of the vehicle 14. When such an assumption is made, the controller 26 may generate the steering angle command for the vehicle 14 as a function independent of the longitudinal distance L between the pivoting connection and the rear axle of the vehicle 14. It is appreciated that the gooseneck trailer mentioned generally refers to the tongue 36 configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 6:
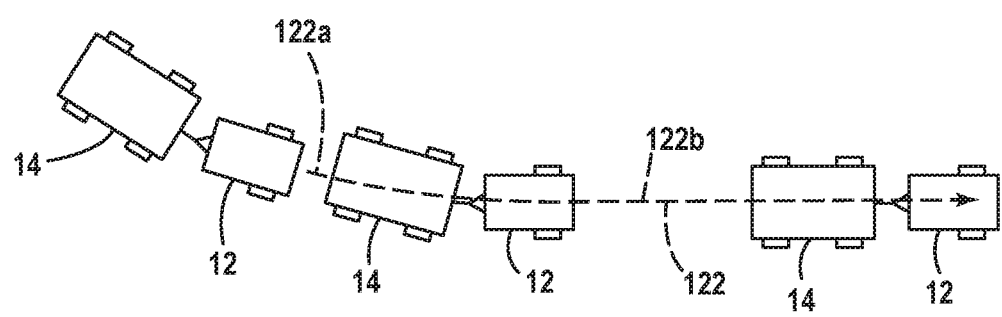
FIG. 6 is a schematic plan view of a motor vehicle and a trailer at various positions along a vehicle path.

With reference to FIG. 6, the vehicle 14 and the trailer 12 move along a path 122 that may include a portion 122a having a smaller radius, and a portion 122b that is substantially straight, or has a large radius. The hitch angle γ is zero when path 122 is straight, and increases as the radius of the path portion 122a decreases. Thus, the hitch angle γ between vehicle 14 and trailer 12 will be greater in the path portions 122a than the relatively straight path portions 122b. The trailer backup assist system 10 may be configured to limit the speed of vehicle 14 and trailer 12 during backup to a maximum speed. For example, when the operator actuates the trailer backup assist system 10 and utilizes the input device knob 20 (FIG. 4), the trailer backup assist system 10 may limit the speed of vehicle 14 to 7 kilometers per hour (kph), even when the hitch angle γ is zero degrees and the vehicle 14 and trailer 12 are moving along a straight portion 122b of path 122. However, according to one embodiment, if the vehicle 14 and trailer 12 are following a portion 122a of path 122 having a relatively small radius of curvature, thereby creating a larger hitch angle γ, the speed of the vehicle 14 may be limited by the trailer backup assist system 10 to a speed that is less than 7 kph to ensure that control is maintained and to avoid jackknifing.

Figure 7:
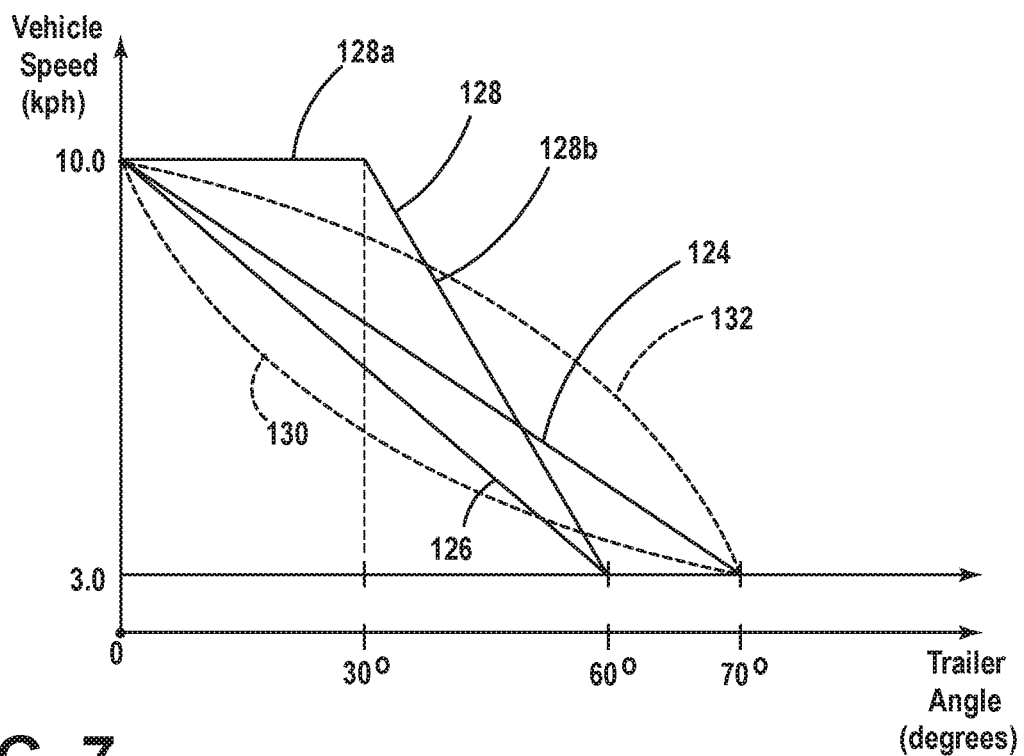
FIG. 7 is a graph showing maximum allowable vehicle speed versus hitch angle.
Figure 8:
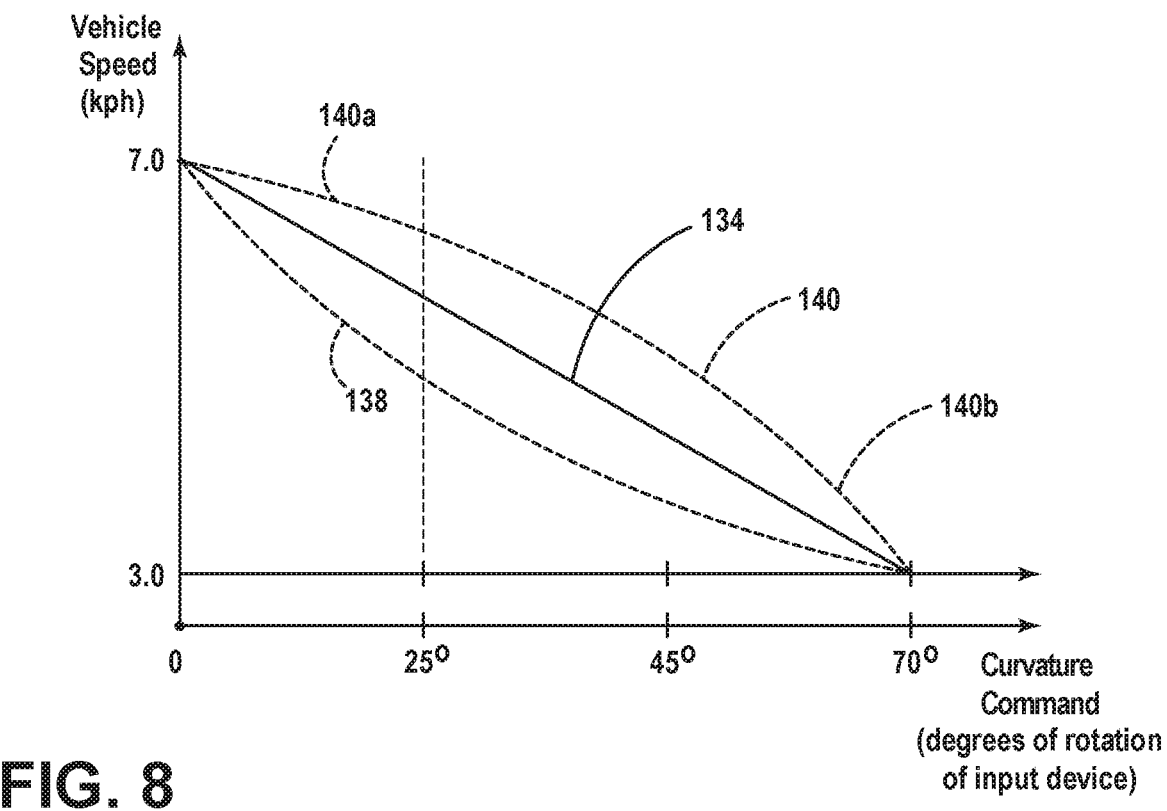
FIG. 8 is a graph showing maximum allowable vehicle speed versus desired input command.

The trailer backup assist system 10 may be configured to set a vehicle threshold speed limit in reverse when a trailer 12 is attached to vehicle 14 to ensure that vehicle 14 can be controlled and to prevent jackknifing or other unacceptable backup conditions. FIG. 7 illustrates various ways to map maximum allowable vehicle speed as a function of hitch angle γ. FIG. 8 illustrates various ways to map maximum allowable vehicle speed as a function of desired command curvature $\kappa_2$. As described herein, both speed limits may be monitored in conjunction with one another by the controller 26 to determine a vehicle threshold speed limit.

In use, the hitch angle γ can be measured while the vehicle 14 is backing up, and the trailer backup assist system 10 limits the vehicle speed using, for example, the vehicle brakes or drivetrain such that the vehicle 14 does not exceed the maximum allowable speed even if a vehicle operator attempts to back up at a higher speed by depressing the accelerator pedal.

With reference to FIG. 7, line 124 represents a maximum allowable vehicle speed at different hitch angles γ. In the illustrated example, the line 124 is a straight line, and the maximum vehicle speed at a hitch angle γ of 0° is 10 kph, and the maximum allowable vehicle speed is reduced to 3 kph at a hitch angle γ of 70°. It will be understood that the maximum vehicle speed may be reduced to 3 kph at a lower hitch angle γ (e.g. 60°) as shown by the line 126. Moreover, it will also be appreciated that the vehicle may be slowed to a speed below 3 kph in some embodiments. For Example, the vehicle may come to a stop when the hitch angle γ approaches to great of an angle to prevent a jack-knife condition.

As shown by the line 128, the maximum vehicle speed may not be limited to a speed that is below 7 kph until a hitch angle γ of significantly greater than 0° (e.g. 30°) is reached, and the maximum vehicle speed may then be limited by a straight line that goes to 0 at a predefined hitch angle γ (e.g. 60°). In FIG. 7, the line 128 includes a segment 128a that is horizontal until the hitch angle γ reaches 30°, and the maximum allowable vehicle speed then transitions linearly to 3 kph as shown by the line segment 128b. The maximum allowable vehicle speed as a function of the hitch angle γ may also be non-linear (e.g. parabolic) as shown by the dashed lines 130 and 132.

The maximum allowable vehicle speed for a given hitch angle γ may be determined empirically to provide a plurality of pairs of data points, and the data may be interpolated utilizing a curve fit to thereby generate a line representing the maximum allowable vehicle speed as a function of the hitch angle γ, which may be stored in an LUT. Alternatively, the maximum allowable vehicle speed as a function of a hitch angle γ may be modeled utilizing a straight (linear) line of the form y=mx+b, or a curved (non-linear) line of the form $y=mx^2+cx+b$, or other suitable equation.

The trailer backup assist system 10 may also take into account other variables to determine the maximum allowable vehicle speed based on hitch angle γ for a given operating condition. For example, the curves (e.g., 124, 128) illustrated in FIG. 7 may be modified to account for hill angles. Specifically, if the vehicle 14 and trailer 12 are backing up a hill, the maximum allowable vehicle speed may be reduced for a given (measured) hitch angle γ. The hill angle may be measured utilizing a gravity sensor on board vehicle 14, or it may be measured utilizing a sensor in the coupler assembly 38 (FIG. 1) interconnecting vehicle 14 and trailer 12. Additional variables such as road conditions may also be utilized to adjust the maximum allowable vehicle speed at a given hitch angle γ. For example, the vehicle 14 may include sensors that enable the trailer backup assist system 10 to determine if the vehicle 14 is on loose gravel, wet pavement, or other surface having reduced traction. If the vehicle 14 and/or trailer 12 are on a gravel or wet surface, the maximum allowable vehicle speed for a given hitch angle γ may be further reduced to ensure that the operator can maintain control of the trailer 12 during the backup operations.

Also, the hill angle may be determined utilizing topographical information that may be stored by the trailer backup assist system 10 or obtained utilizing a GPS system. Vehicle 14 may include an electronic compass or other positioning device 74 whereby the location and orientation of vehicle 14 on a topographical map may be determined, such that the hill angle of the vehicle 14 and trailer 12 can be determined.

Also, road condition data can be obtained from a remote source, and the maximum allowable vehicle speed can be adjusted if required. For example, if weather data in the vicinity of vehicle 14 indicates that it is raining or snowing, the maximum allowable vehicle speed for a given (measured) hitch angle γ may be reduced to account for the decrease in traction. Similarly, map data concerning the road surface (e.g. gravel or paved road) may be utilized to adjust the maximum allowable vehicle speed as a function of hitch angle γ.

With reference to FIG. 8, line 134 represents a maximum allowable vehicle speed at different magnitudes of the input device 18. In the illustrated example, the line 134 is a straight line, and the maximum vehicle speed at a hitch angle γ of 0° is 7 kph, and the maximum allowable vehicle speed is reduced to 3 kph at a hitch angle γ of 70°, or any other desired speed and/or a stopped condition, as described above. Also, as described above and shown by the line 140a, the maximum vehicle speed may not be significantly limited to speed that is below 7 kph until a input magnitude that is significantly greater than 0° (e.g. 60°) is reached, and the maximum allowable vehicle speed then transitions parabolicly to 0 as shown by the line segment 140b. The maximum allowable vehicle speed as a function of the input magnitude of the input device 18 might also be linear in alternate embodiments.

The maximum allowable vehicle speed for a given input magnitude may be determined empirically to provide a plurality of pairs of data points, and the data may be interpolated utilizing a curve fit to thereby generate a line representing the maximum allowable vehicle speed as a function of the input magnitude. Alternatively, the maximum allowable vehicle speed as a function of the input magnitude of the input device 18 may be modeled utilizing a straight line, or a curved line, or other suitable equation, as described above.

In operation, a user activates the trailer backup assist system 10, and begins to back up the vehicle 14 and trailer 12. The user utilizes the input device 18 to provide the desired command curvature $κ_2$ to the trailer backup assist system 10. The trailer backup assist system 10 utilizes vehicle speed and hitch angle γ data to determine a maximum allowable vehicle threshold speed, taking into account road conditions and the like, as discussed above.

In general, the trailer backup assist system 10 may ensure that the vehicle 14 and trailer 12 do not exceed the maximum threshold trailer angle by limiting the speed of the vehicle 14, limiting the vehicle curvature, or both. Limiting the vehicle speed can be accomplished by sending a command to the brake control system 62 and/or the powertrain control module 14. The brake control system 62 can be utilized to apply the brakes of the vehicle 14 and/or the brakes of a trailer 12 if the trailer 12 is equipped with brakes. Also, the powertrain control module 14 can be utilized to limit the amount of torque generated by the vehicle's engine and/or by down shifting the engine transmission to utilize engine braking if the vehicle 14 has an internal combustion engine. If the vehicle 14 has an electric motor 84, the powertrain system control module may utilize the electric motor 84 to provide braking. The trailer backup assist system 10 may also be configured to increase the vehicle speed if the vehicle speed and hitch angle γ are within the allowable limits.

The trailer backup assist system 10 may also be configured to control the angle of the steered wheels to ensure that the vehicle speed versus hitch angle γ (FIG. 7) does not exceed the allowable limits. In this case, the trailer backup assist system 10 will limit the angle of the steered wheels to a level that is lower than the inputted input command request by the user utilizing the knob 20 (FIG. 4) to prevent the hitch angle γ from exceeding the allowable limits for a given vehicle speed. Thus, the trailer backup assist system 10 may "override" a user steering request and generate a steering command curvature $κ_2$ that includes a reduced steering angle relative to the user steering request. For example, if the vehicle 14 is traveling in reverse at 7 kph, and an operator rapidly rotates the knob 20, the trailer backup assist system 10 may apply the brakes to slow the vehicle 14, but the capability of the trailer backup assist system 10 may not allow the speed of the vehicle 14 to be reduced quickly enough to permit the vehicle 14 to follow the steering input by the user. In this case, the trailer backup assist system 10 may generate a steering command to the power assist steering system 64 that is reduced to avoid unacceptable operating conditions (i.e. too tight of a turn for the vehicle speed). Also, if vehicle 14 is traveling at a very slow speed (e.g. 1.0 kph), the hitch angle γ is still limited due to the physical constraints of the interface between the vehicle 14 and the trailer 12. Thus, the trailer backup assist system 10 may be configured to modify user steering requests and to limit the commands to the power assist steering system 64 to a maximum value that may be less than an input request by a user utilizing the knob 20.

Alternatively, the trailer backup assist system 10 may be configured to reduce the maximum threshold speed of the vehicle 14 if the input magnitude is calculated to cause unacceptable backup conditions without a reduction in speed. The unacceptable backup condition may be soon to occur, or alternatively, the controller 26 may be configured to foresee the onset of an unacceptable backup condition arising if an alteration to the maximum threshold speed is not made.

Figure 9:
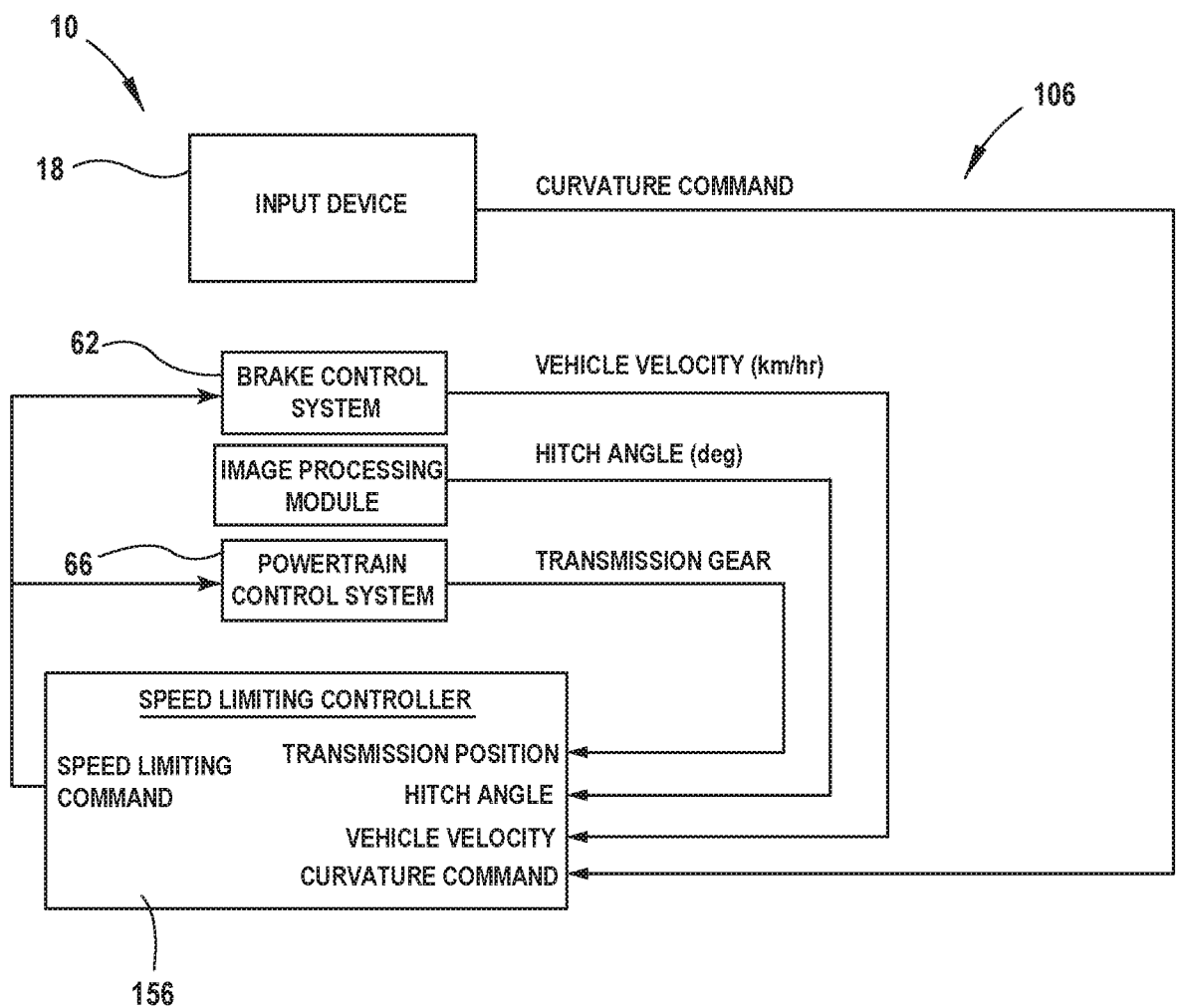
FIG. 9 is a schematic block diagram illustrating portions of a curvature controller, according to an additional embodiment, and other components of the trailer backup assist system, according to such an embodiment.

Furthermore, the trailer backup assist system 10 may be configured to prioritize the user-requested steering input from the knob 20 over the vehicle speed when determining whether to limit the vehicle speed or limit the turn angle to avoid the maximum allowable values as shown in FIGS. 8-9. In general, the input provided by a user to the knob 20 corresponds to a desired trailer path (e.g. trailer path 122; FIG. 6), and the trailer backup assist system 10 may be configured to assume that the desired path is more important than the desired speed. Thus, the trailer backup assist system 10 may be configured to first adjust the vehicle speed to stay within the maximum allowable vehicle speed shown in FIGS. 8-9, followed by (in terms of priority) limiting the trailer curvature, if required, to stay within the allowable limits shown in FIGS. 8-9.

Also, the actual steering angle may lag the steering angle request, and the final (static) steering angle may be somewhat less than the steering request. The trailer backup assist system 10 may be configured to optimize the vehicle speed in reverse to follow the desired path 122 (FIG. 6) within an acceptable error. This allows the trailer backup assist system 10 to keep the steering speed within an optimum range to help keep the vehicle 14 on the desired path 122 with an acceptable amount of error. In general, the required speed of the power assist steering system 64 is a function of the vehicle speed and the lateral movement needed to follow the desired path 122. For example, the steering speeds required to follow a particular lateral change in path increase with vehicle speed. Likewise, the steering speeds required at a particular vehicle speed increase as the change in lateral movement increases.

In general, the vehicle speed and steering can be controlled to optimize the vehicle path in any combination. For example, the power train system control module 66 (FIG. 2) may be configured to control the torque output. The torque output can be monitored and modified to help maintain the optimum speed to support the capability of the power assist steering system 64 to position the vehicle 14 on a desired path. The power train torque output may be limited to reduce the speed of the vehicle 14 when needed by the power assist steering system 64 to keep the vehicle path error within a desirable range. Similarly, the brake torque generated may also be monitored and modified to help maintain the optimum speed to support the capability of the power assist steering system 64 to position the vehicle on a desired path.

The brake control system 62 may be actuated to reduce the speed of the vehicle 14 when needed by the power assist steering system 64 to keep the path error within a desirable range. Furthermore, the automatic gear selection of the vehicle 14 may be controlled, and the vehicle 14 may down shift to facilitate engine braking and reduce the risk of overheating the braking system. Still further, if the vehicle 14 is backing up with a trailer 12 attached, and if the trailer 12 has trailer brakes, the trailer brake torque may be monitored and modified to help maintain the optimum speed to support the capability of the power assist steering system 64 to position the vehicle 14 on a desired path. The trailer brake torque may be applied to help reduce the speed of the vehicle 14 when needed by the power assist steering system 64 to keep the path error within a desirable range.

Referring to FIG. 9, the curvature routine 106 of the trailer backup assist system 10 is illustrated showing an architectural layout, according to one embodiment. The trailer backup assist system 10 includes a plurality of inputs that communicate with a speed limiting controller 156 such that routines stored in the memory 104 of the speed limiting controller 156 may operate based on the plurality of inputs. The plurality of inputs may include memory devices separate from or integrated with the trailer backup assist system controller 26 within the vehicle 14 that stores data from sensors of the trailer backup assist system 10, such as the hitch angle sensor 24, the vehicle speed sensors 78, the steering angle sensor 70, or alternatively the plurality of inputs may otherwise directly transmit data from the sensors without functioning as a memory device. Moreover, it will be appreciated that each of the plurality of inputs disposed within the vehicle 14 may be an independent system disposed within the vehicle 14, or integrally disposed within any system within the vehicle 14.

As illustrated in FIG. 9, a input device 18 may be configured to accept a input command that corresponds to the desired command curvature $\kappa_2$. In some embodiments, the input device 18 may be in a separate system disposed within the vehicle 14 or the trailer 12, such as a trailer tow lighting module. In the illustrated layout, the input device 18 provides the desired command curvature $\kappa_2$ to the speed limiting controller 156, which may be determined from the desired backing path 16 that is input with the input device 18. The speed limiting controller 156 computes a desired speed threshold based on the desired curvature $\kappa_2$ and the current hitch angle $\gamma$.

As further illustrated in FIG. 9, the brake control system 62 transmits a vehicle speed to the speed limiting controller 156. An image processing module 142 may continuously determine the hitch angle $\gamma$ between the vehicle 14 and trailer 12, as described herein. The powertrain control system 66 may transmit the current status of the transmission to the speed limiting controller 156.

Once the desired speed threshold is computed by the speed limiting controller 156, the speed limiting controller 156 generates a speed limiting command based on desired speed threshold and a current velocity of the vehicle 14. The speed limiting controller 156 outputs data, in the form of a speed limiting command, the brake control system 62, the powertrain control system 66, and/or any other practicable system within the vehicle 14, which is then fed back to the plurality of inputs 62, 66, 142 to reassess the impacts of other vehicle characteristics impacted from the implementation of the speed limiting command or other changes to the trailer backup assist system 10. Accordingly, the speed limiting controller 156 continually processes information from the plurality of inputs 62, 66, 142 to provide accurate steering angle commands that place the trailer 12 on the desired curvature $\kappa_2$ and the desired backing path 16, without substantial overshoot or harsh variations in the vehicle threshold speed limit about the desired curvature $\kappa_2$.

The closed loop speed limiting controller 156 is configured such that the threshold speed limit of the vehicle 14 may be a function of both desired command curvature $\kappa_2$ and hitch angle $\gamma$. As a result, the speed may be automatically limited to a range that enables consistent operation and maximum maneuverability. Speed and jackknife warnings may significantly be reduced, or may be substantially removed from the system operation altogether. Also, driver braking may only be required based on user comfort level and the desired speed for moving the trailer 12. It may not be required to keep the trailer backup assist system 10 functioning or improve the trailer backup assist system's 10 maneuverability. As described herein, the speed limiting controller 156 may determine a first speed limit based on desired command curvature $\kappa_2$ and a second speed limit based on the instantaneous hitch angle $\gamma$. The speed limiting controller 156 may filter the two speed limits to determine a vehicle threshold speed limit. For example, the speed limiting controller 156 may set the vehicle threshold speed limit at the lower of the first and second speed limits. Alternatively, higher order comparative analysis may be utilized by the speed limiting controller 156, as will be described in more detail below.

Figure 10:
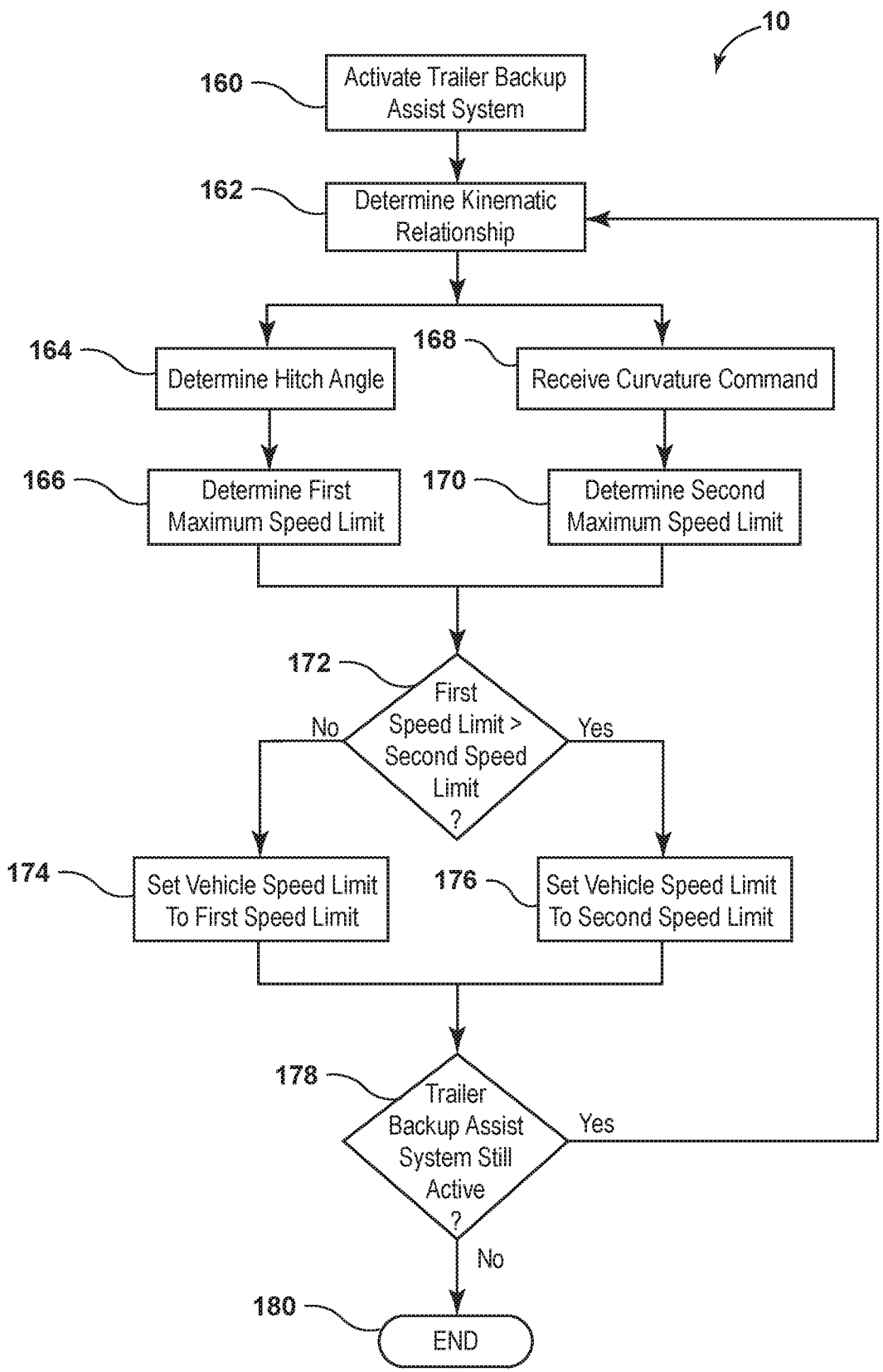
FIG. 10 is a flow chart of the curvature controller of FIG. 9, showing the signal flow of the curvature controller, according to such an embodiment.

With reference to FIG. 10, an embodiment of the trailer backup assist system 10 is illustrated in which the trailer backup assist system 10 is configured to monitor the hitch angle $\gamma$ and desired command curvature $\kappa_2$ to control the threshold speed of the vehicle 14 to allow the trailer backup assist system 10 to assist in the prevention of unacceptable backup conditions by limiting the threshold speed of the vehicle 14.

The method illustrated in FIG. 10 begins, generally, when the trailer backup assist system 10 is activated in step 160. In step 160, the trailer backup assist system 10 begins the process to steer the vehicle 14 along the desired command curvature $\kappa_2$ with a threshold speed limit, as described above. In step 162, the kinematic relationship between the trailer 12 and vehicle 14 to which trailer 12 is attached is determined. To determine the kinematic relationship in step 162, various parameters of the vehicle 14 and the trailer 12 are sensed, or otherwise determined for the trailer backup assist system 10, to generate steering commands to the power assist steering system 64 in accordance with the desired curvature $\kappa_2$ or backing path 16 of the trailer 12.

As disclosed with reference to FIG. 5, the kinematic parameters to define the kinematic relationship may include a length of the trailer 12, a wheel base of the vehicle 14, and a distance from a hitch connection to a rear axle of the vehicle 14 and a hitch angle $\gamma$ between the vehicle 14 and the trailer 12, among other variables and parameters as previously described. After the kinematic relationship is determined, the trailer backup assist system 10 may proceed at step 164 to determine a current hitch angle $\gamma$ by receiving input from a sensor 44 (FIG. 1) or by executing a hitch angle estimation routine 110 carried out by the trailer backup assist system 10 using yaw rate sensor 58 of trailer 12, yaw rate sensor 58 of the vehicle 14, among other inputs related to the kinematic relationship, and as described further in U.S. Pat. No. 9,340,228, entitled "TRAILER MOTION AND PARAMETER ESTIMATION SYSTEM," the entire disclosure of which is incorporated herein by reference. Concurrently, the desired command curvature $\kappa_2$ is received from input device 18 in step 168, which is processed based on the input magnitude of the input device 18 and the kinematic relationship. Next, at step 166, the trailer backup assist system 10 determines a first maximum vehicle speed limit based on the hitch angle $\gamma$, as described above. A second maximum speed limit is determined based on the desired command curvature $\kappa_2$, as also described above, at step 170.

According to the illustrated embodiment, the trailer backup assist system 10, at step 172, compares the first maximum speed limit based on the hitch angle $\gamma$ to the second maximum speed limit based on the desired command curvature $\kappa_2$ and sets the vehicle threshold speed limit at the lower of the two values. Accordingly, if the first speed limit is less than the second speed limit, at step 174, the vehicle speed limit will be set at the first speed limit. If, however, the first speed limit is greater than the second speed limit, at step 176, the second speed limit is set as the threshold vehicle speed limit. The trailer backup assist system 10 can continue to repeat steps 162-178 as long as trailer backup assist system 10 remains active (step 160).

The trailer backup assist system 10 continues to monitor hitch angle $\gamma$ and input device 18 to generate and implement an appropriate vehicle threshold speed, which can be done using the speed sensors 78. The trailer backup assist system 10 can then compare the first and second vehicle speed limits and determine if intervention is desired based on any comparative analysis. As discussed above, the threshold speed can be a speed at which trailer backup assist system 10 is capable of generating and implementing a steering command to prevent hitch angle $\gamma$ from approaching jackknife angle $\gamma(j)$ at an uncontrollable rate, which may be influenced by, among other things, the speed of the processor 192, the responsiveness of power assist steering system 64, and in particular electric steering motor 84, as well as length L of trailer 12. The speed threshold can be predetermined and stored for access by the trailer backup assist system 10 in carrying out a comparison of the first and second vehicle speed limits to the threshold speed. The speed threshold can be estimated based on the parameters provided herein, while conservatively estimating for a short trailer length L.

Figure 11:
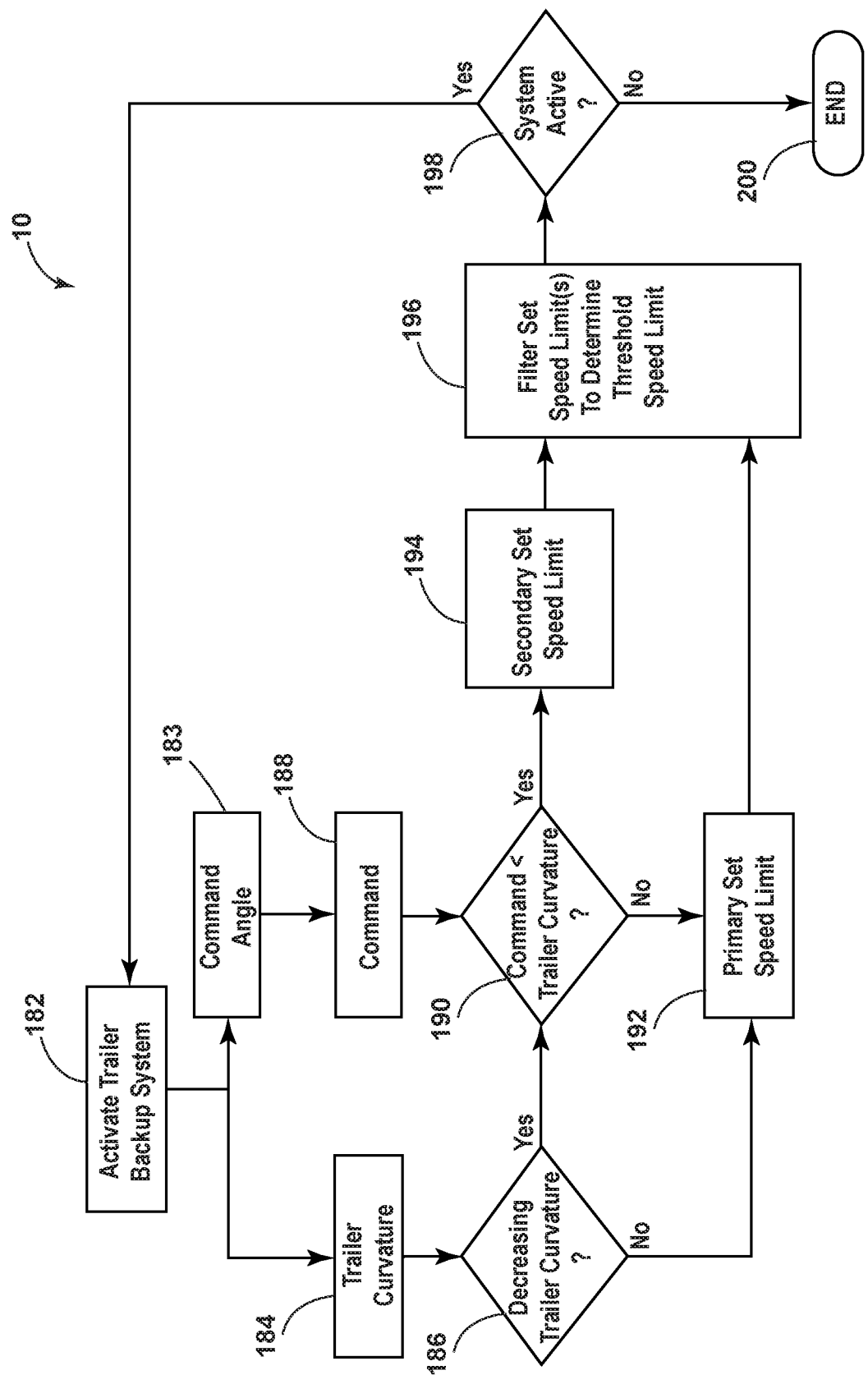
FIG. 11. is a flow chart of the curvature controller of FIG. 9, showing the signal flow of the curvature controller, according to such an embodiment, wherein the controller sets a plurality of speed limits, filters, and compares the speed limits to determine a threshold speed limit.

With reference to FIG. 11, the trailer backup assist system 10 is illustrated, according to one embodiment, in which the hitch angle $\gamma$ and desired command curvatures $\kappa_2$ are continually monitored. It may be advantageous to implement a higher order function or LUT to generate a first or second speed limit from the hitch angle $\gamma$ and/or desired command curvature $\kappa_2$. Further, rather than simply assigning the threshold speed limit to the minimum, as described in reference to FIG. 10, it may be desirable to have a primary and a secondary set speed limit that allows higher vehicle speeds when the absolute value of the hitch angle $\gamma$ rate is decreasing and/or the desired command curvature $\kappa_2$ input magnitude is decreasing thereby resulting in a decreasing absolute hitch angle $\gamma$ rate.

As illustrated in FIG. 11, the system begins at step 182. At step 184, the trailer backup assist system 10 calculates whether the hitch angle $\gamma$ rate is increasing or decreasing. If the hitch angle $\gamma$ is not decreasing, at step 186, the system 10 continues to step 192 and sets a primary set speed limit based on values stored within a LUT, or through any other means. At step 183, the desired command angle is received from the input device 18. At step 188, the trailer backup assist system 10 receives the desired command angle and calculates the corresponding command curvature $\kappa_2$ supplied to the system from the input device 18, or any other practicable device. At step 190, the trailer backup assist system 10 calculates if the desired command curvature $\kappa_2$ is less than the hitch angle $\gamma$. If the desired command curvature $\kappa_2$ is not less than the hitch angle $\gamma$, the primary speed limit that is set in step 192 is utilized. If, however, the desired command curvature $\kappa_2$ is less than the instantaneous hitch angle $\gamma$, a secondary speed limit is set at step 194. The primary and secondary speed limits are both inputted into a filter within the controller at step 196. Based on the predefined calculation method within the filter, the filter may determine the threshold speed limit of the vehicle based on the instantaneous inputted primary and secondary set speed limits. The trailer backup assist system 10 can continue to repeat steps 184-198 as long trailer backup assist system 10 remains active (step 198).

Accordingly, if only the primary speed limit is set, the vehicle speed limit is set at the primary speed limit. If a primary speed limit and a secondary speed limit are set, the speed limits are filtered to determine the vehicle threshold speed. The filter may be configured as a discrete-time low-pass filter of any order, continuous-time low-pass filter of any order, and/or a band-pass filter. Alternatively, the controller 26 may calculate the threshold speed based on an average of the primary and secondary speed limits, set the threshold speed limit at the higher or lower value, interpolate between any number of values, use a best fit analysis, and/or use any other comparative technique that may eliminate faults within the trailer backup assist system 10. The vehicle threshold speed may be filtered before it is passed to the feedback controller, which may help with smooth transitions between threshold speed limits.

The primary speed limit may be set based on any desired input within the trailer backup assist system 10. Likewise, the second speed limit may also be set on any other desired input. The controller 26 may then filter the first and second inputs, if more than a single input exists, based on any known method to determine an instantaneous threshold speed for the vehicle 14. Moreover, it is contemplated that the controller 26 may determine a vehicle threshold speed based on any number of inputs that are monitored by the vehicle 14 and/or the trailer 12 during utilization thereof.

With reference to FIGS. 10 and 11, the trailer backup assist system 10 can compare the vehicle threshold speed determined in step 172 with the actual vehicle speed. If the vehicle speed is below the threshold speed, trailer backup assist system 10 continues without intervention. If the vehicle speed is above the threshold speed, trailer backup assist system 10 may take action such as by causing powertrain control system 66 to reduce engine output, which can be done by adjusting the throttle position to decrease the output below that which is being demanded by the position of the accelerator pedal, as directed by the driver. The trailer backup assist system 10 can continue to monitor the vehicle speed to determine if the action is sufficient to reduce the speed of vehicle 14 to below the threshold speed. If, at such a point, the vehicle speed has been reduced to below the threshold speed, trailer backup assist system 10 can return to normal operation or can continue to cause power train control system 74 to operate at a reduced throttle position so long as needed to effectively maintain vehicle speed below the threshold speed. If, after reducing engine output the trailer backup assist system 10 determines that the vehicle speed is still above the threshold speed, the trailer backup assist system 10 can cause vehicle brake control system 62 to actuate the vehicle brakes, thereby applying a brake torque to vehicle 14 to further attempt to slow vehicle speed to below the threshold speed.

Again, the trailer backup assist system 10 can continue to cause vehicle 14 to operate at a reduced engine output and with brakes applied as long as necessary to effectively maintain vehicle speed below threshold speed. Similarly, trailer backup assist system 10 can reduce brake torque, including to zero, and can restore engine output if it has been determined that no further intervention is required. If, however, it is determined that the reduction in engine output and the application of brake torque is not sufficient to lower the speed of vehicle 14 to below the threshold speed, trailer backup assist system 10 can take further measures, including presenting a warning to the driver, including by displaying a warning message on display 100 of vehicle HMI 98 or by issuing an audible tone, such as through speaker 96. It is noted that, in various embodiments the actions described herein can be carried out in various alternative orders, including initially presenting a warning to the driver before reducing engine output and applying a brake torque. In further alternative embodiments, trailer backup assist system 10 can be configured to apply a brake torque prior to reducing engine output.

The trailer backup assist system 10, having the features shown in FIG. 11, may operate at higher speeds during straight or small curvature maneuvers where a large distance may need to be covered at low hitch angles and small input magnitudes in a desired command curvature $\kappa_2$. Also, jackknifing robustness may be enhanced by lowering the threshold speed as the system goes into high hitch angle conditions or is close to a jackknife condition. Further, changes in vehicle speed may be perceptively smoother and more consistent to an occupant while in a turn with the varying speed threshold that is determined based on a plurality of inputs and filtration of those inputs as the system may regulate the vehicle threshold speed within a safe operating speed prior to the onset of an unacceptable backup condition.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A trailer backup assist system, comprising:
   a hitch angle sensor configured to determine a hitch angle between a vehicle and a trailer attached thereto;
   an input device configured to accept an input command corresponding to a trailer path command curvature; and
   a controller configured to determine a vehicle threshold speed limit by determining a first vehicle speed limit based on the hitch angle and a second vehicle speed limit based on the command curvature, wherein the controller generates a command to limit vehicle speed in a reverse direction below the threshold speed limit and the vehicle threshold speed limit is set to the higher of the first and second vehicle speed limits when a magnitude of an input command rate is decreasing and the vehicle threshold speed limit is set to the lower of the first and second vehicle speed limits when a magnitude of input command rate is increasing.

2. The trailer backup assist system of claim 1, wherein the command controls at least one of a brake system, an engine torque, and a transmission gear selection to thereby control the vehicle speed in the reverse direction.

3. The trailer backup assist system of claim 2, wherein the brake system is a vehicle brake system.

4. The trailer backup assist system of claim 1, wherein the vehicle threshold speed limit is the higher of the first and second vehicle speed limits when a magnitude of hitch angle rate is decreasing and the desired trailer path command curvature is less than an instantaneous trailer path curvature.

5. The trailer backup assist system of claim 1, wherein the input device includes a rotatable knob configured to be mounted in a vehicle interior.

6. A method of controlling the speed of a motor vehicle, the method comprising:
   determining a hitch angle between a vehicle and a trailer attached to the vehicle;
   determining a trailer curvature command based on an input device;
   calculating a first vehicle speed limit based on the hitch angle;
   calculating a second speed limit based on the trailer path curvature command;
   determining a threshold speed limit based on the first and second speed limits; and
   limiting the speed of the vehicle to the threshold speed, wherein a controller sets the vehicle threshold speed limit at the higher of the first and second speed limits when an absolute value of a hitch angle rate is decreasing and a trailer curvature command rate is also decreasing.

7. The method of claim 6, wherein a vehicle is maintained below the threshold speed limit by controlling at least one of a brake system, an engine torque, and a transmission gear selection to move the trailer along a desired trailer curvature path that is within an acceptable error criteria.

8. The method of claim 6, wherein the input device receives an input as an input magnitude that is correlated to a corresponding trailer curvature path based on values stored in a look-up table.

9. The method of claim 6, wherein the input device is biased towards a neutral position.

* * * * *